Figure 1:
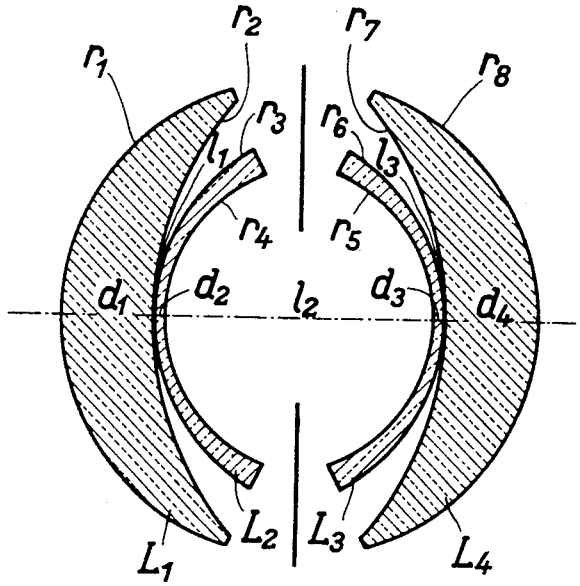

Feb. 25, 1936.    R. RICHTER    2,031,792
ANASTIGMATIC OBJECTIVE FOR PHOTOGRAPHY AND PROJECTION
Filed July 25, 1934    3 Sheets-Sheet 1

$r_1$ = 11.25
$r_2$ = 16.55
$r_3$ = 9.094
$r_4$ = 7.35
$r_5$ = 7.35
$r_6$ = 9.094
$r_7$ = 16.55
$r_8$ = 11.25

$d_1$ = 4.44
$l_1$ = 0.02
$d_2$ = 0.5
$l_2$ = 12.98
$d_3$ = 0.5
$l_3$ = 0.02
$d_4$ = 4.44

|  | $L_1 = L_4$ | $L_2 = L_3$ |
|---|---|---|
| $n_D$ = | 1.6201 | 1.7172 |
| $v$ = | 60.4 | 29.5 |

Inventor:
Robert Richter

| | | | |
|---|---|---|---|
| $r_1$ = 12.63 | | $d_1$ = 4.89 | |
| $r_2$ = 17.70 | | $l_1$ = 0.02 | |
| $r_3$ = 10.05 | | $d_2$ = 0.5 | |
| $r_4$ = 8.29 | | $l_2$ = 15.38 | |
| $r_5$ = 8.29 | | $d_3$ = 0.5 | |
| $r_6$ = 10.05 | | $l_3$ = 0.02 | |
| $r_7$ = 18.95 | | $d_4$ = 5.07 | |
| $r_8$ = 12.93 | | | |

| | $L_1 = L_4$ | $L_2 = L_3$ |
|---|---|---|
| $n_D$ = | 1.6185 | 1.7261 |
| $\nu$ = | 60.5 | 29.0 |

Inventor:
Robert Richter

Feb. 25, 1936.  R. RICHTER  2,031,792
ANASTIGMATIC OBJECTIVE FOR PHOTOGRAPHY AND PROJECTION
Filed July 25, 1934  3 Sheets-Sheet 3

| | | | | |
|---|---|---|---|---|
| $r_1$ = | ∞ | $d_1$ = 10.6 | $n_D$ = 1.5163 | $\nu$ = 64.0 |
| $r_2$ = | ∞ | $l_1$ = 0.5 | | |
| $r_3$ = | 11.25 | $d_2$ = 4.46 | $n_D$ = 1.6201 | $\nu$ = 60.4 |
| $r_4$ = | 16.84 | $l_2$ = 0.02 | | |
| $r_5$ = | 9.1886 | $d_3$ = 0.5 | $n_D$ = 1.7172 | $\nu$ = 29.5 |
| $r_6$ = | 7.36 | $l_3$ = 12.974 | | |
| $r_7$ = | 7.36 | $d_4$ = 0.5 | $n_D$ = 1.7172 | $\nu$ = 29.5 |
| $r_8$ = | 9.1886 | $l_4$ = 0.02 | | |
| $r_9$ = | 16.84 | $d_5$ = 4.46 | $n_D$ = 1.6201 | $\nu$ = 60.4 |
| $r_{10}$ = | 11.25 | $l_5$ = 0.5 | | |
| $r_{11}$ = | ∞ | $d_6$ = 10.6 | $n_D$ = 1.5163 | $\nu$ = 64.0 |
| $r_{12}$ = | ∞ | | | |

Inventor:
Robert Richter

Patented Feb. 25, 1936

2,031,792

UNITED STATES PATENT OFFICE 2,031,792

ANASTIGMATIC OBJECTIVE FOR PHOTOGRAPHY AND PROJECTION

Robert Richter, Jena, Germany, assignor to the firm of Carl Zeiss, Jena, Germany Application July 25, 1934, Serial No. 736,880
In Germany July 26, 1933

9 Claims. (Cl. 88—57)

The present invention concerns anastigmatic objectives for photography and projection having a pair of meniscal members bounded by air at either side of the locus of diaphragm. Each of the pairs consists of a diverging and a converging member. The diverging member of each pair and the concave surfaces of all members face the locus of diaphragm and those two surfaces of each pair which face each other are differently curved. The locus of diaphragm is understood to be that point in the optical axis of the objective in the vicinity of which the principal rays of the inclined pencils of rays intersect the optical axis and near which the aperture diaphragm is usually placed when the restriction of the aperture is not effected by the edges of the mounts of the lenses. The known objectives of this kind have either only the said two pairs of members or they have other members for improving the correction. In the known objectives, the distance apart of the vertices of the two surfaces immediately in front and behind the locus of diaphragm has been smaller than approximately one half the arithmetical means of the radii of curvature of these two surfaces.

According to the invention, the capacity of this kind of objectives is considerably increased by increasing the distance apart of the two concave surfaces in the vicinity of the locus of diaphragm, the said distance being made greater than four fifths of the arithmetical means of the radii of curvature of these two concave surfaces. There is thus obtained an objective which has a great rapidity and may be used as a wide-angle lens, since it may be corrected spherically, chromatically as well as astigmatically much better than any objective known so far.

The angle of view can be increased with these objectives by more than 100° when the said distance apart is made greater than the arithmetical means of the radii of curvature of the two concave surfaces near the locus of diaphragm.

To obtain as great an angle of view as possible, it is advisable to make the objective consist of only four single lenses, the locus of diaphragm having at either side one converging and one diverging lens, and the refractive indices of the diverging lenses being suitably greater than 1.65. It is advantageous to provide that the diverging lenses are near the locus of diaphragm and have central thickness smaller than 2% of the focal length of the objective.

When the objectives are symmetrical to the locus of diaphragm, the images of objects at great distances are generally distorted a little, since, as a rule, only reproduction in natural size is not affected by the distortion of symmetrical objectives. The principal aim of photography is, however, to reproduce objects at a great distance, and that of projection is to project near objects at a great distance. To avoid distortion, the objectives are generally made dissymmetrical. With the objectives according to the invention it has been achieved to remove the distortion in the case of objects at infinity by making dissymmetrical only one pair of members and maintaining the symmetry of the other pairs. This advantage is very significant because it is made possible to use a symmetrical pair of flint glasses, whose manufacture offers considerable difficulties, in the interior and to neutralize the distortion by a dissymmetry of the two converging members.

The objectives according to the invention may be also constructed in such a manner that the distortion is removed regardless of the imaging scale, as is desired for instance in the case of objectives for evaluating distorted photogrammetric photographs. This is achieved by making the objective consist not only of four members whose concave surfaces face the locus of diaphragm but also of at least one exterior lens whose radii of curvature are, absolutely, greater than the focal length of the objective or of an exterior plano-parallel plate. In this case a distortion is avoided also when the objective is symmetrical, use being made of a pair of additional lenses or plates.

Figure 2:
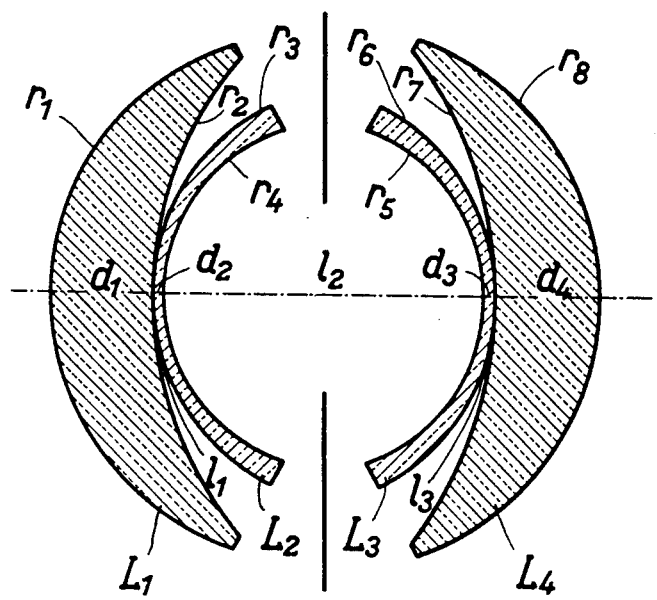
Figure 3:
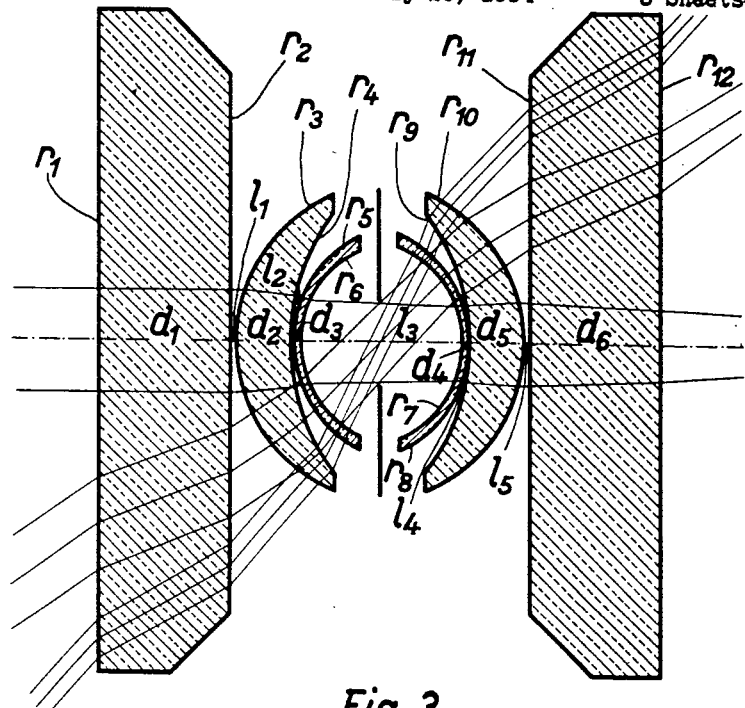

The accompanying drawings and the following tables refer to three different objectives according to the invention. In the drawings, Figures 1, 2 and 3 illustrate sections through, and containing the optical axes of, the objectives according to the first, the second and the third constructional example, respectively.

The first constructional example, which is illustrated by Figure 1, consists of a symmetrical objective having four lenses $L_1$, $L_2$, $L_3$, and $L_4$ whose sides facing the locus of diaphragm are concave. The focal length of the objective is $f_D=66.0$ millimetres. The objective has a good central definition also when the ratio of aperture is 1:6.3, the anastigmatic correction covering a field of view of 100° with only very slight intermediate errors. The dimensions in millimetres and the kinds of glass of this objective are as follows:

| Radii | Thicknesses and distances | Kinds of glass |
|---|---|---|
| $r_1 = 11.25$ | | |
| $r_2 = 16.55$ | $d_1 = 4.44$ | $n_D = 1.6201 \quad \nu = 60.4$ |
| $r_3 = 9.094$ | $l_1 = 0.02$ | |
| $r_4 = 7.35$ | $d_2 = 0.5$ | $n_D = 1.7172 \quad \nu = 29.5$ |
| $r_5 = 7.35$ | $l_2 = 12.98$ | |
| $r_6 = 9.094$ | $d_3 = 0.5$ | $n_D = 1.7172 \quad \nu = 29.5$ |
| $r_7 = 16.55$ | $l_3 = 0.02$ | |
| $r_8 = 11.25$ | $d_4 = 4.44$ | $n_D = 1.6201 \quad \nu = 60.4$ |

The second constructional example (Figure 2) has a focal length of $f_D = 75.7$ millimetres and consists of four lenses $L_1$, $L_2$, $L_3$ and $L_4$. The two exterior lenses $L_1$ and $L_4$ are dissymmetrical and the two interior lenses $L_2$ and $L_3$ are symmetrical to the locus of diaphragm. This objective has the following dimensions:

| Radii | Thicknesses and distances | Kinds of glass |
|---|---|---|
| $r_1 = 12.63$ | | |
| $r_2 = 17.70$ | $d_1 = 4.89$ | $n_D = 1.6185 \quad \nu = 60.5$ |
| $r_3 = 10.05$ | $l_1 = 0.02$ | |
| $r_4 = 8.29$ | $d_2 = 0.5$ | $n_D = 1.7261 \quad \nu = 29.0$ |
| $r_5 = 8.29$ | $l_2 = 15.38$ | |
| $r_6 = 10.05$ | $d_3 = 0.5$ | $n_D = 1.7261 \quad \nu = 29.0$ |
| $r_7 = 18.95$ | $l_3 = 0.02$ | |
| $r_8 = 12.93$ | $d_4 = 5.07$ | $n_D = 1.6185 \quad \nu = 60.5$ |

Figure 3 of the drawings represents a symmetrical objective which has not only four lenses $L_1$, $L_2$, $L_3$ and $L_4$ whose sides facing the locus of diaphragm are concave but also two exterior plano-parallel plates $P_1$ and $P_2$. With this constructional example, the distortions corresponding to the imaging scales 1:1 and $\infty:1$, respectively, are neutralized to a small intermediate error. The focal length of this objective is $f_D = 66.1$ millimetres. The objective may be also used with the ratio of aperture 1:6.3 and the angle of view 100°.

| Radii | Thicknesses and distances | Kinds of glass |
|---|---|---|
| $r_1 = \infty$ | | |
| $r_2 = \infty$ | $d_1 = 10.6$ | $n_D = 1.5163 \quad \nu = 64.0$ |
| $r_3 = 11.25$ | $l_1 = 0.5$ | |
| $r_4 = 16.84$ | $d_2 = 4.46$ | $n_D = 1.6201 \quad \nu = 60.4$ |
| $r_5 = 9.1886$ | $l_2 = 0.02$ | |
| $r_6 = 7.36$ | $d_3 = 0.5$ | $n_D = 1.7172 \quad \nu = 29.5$ |
| $r_7 = 7.36$ | $l_3 = 12.974$ | |
| $r_8 = 9.1886$ | $d_4 = 0.5$ | $n_D = 1.7172 \quad \nu = 29.5$ |
| $r_9 = 16.84$ | $l_4 = 0.02$ | |
| $r_{10} = 11.25$ | $d_5 = 4.46$ | $n_D = 1.6201 \quad \nu = 60.4$ |
| $r_{11} = \infty$ | $l_5 = 0.5$ | |
| $r_{12} = \infty$ | $d_6 = 10.6$ | $n_D = 1.5163 \quad \nu = 64.0$ |

When this objective is used for photographing infinitely distant objects, the plate facing the object is not required and may be dispensed with. The objective offers special advantages also in this case, since the intermediate error of distortion is especially insignificant.

I claim:

1. An anastigmatic objective for photography and projection, comprising two pairs of meniscal members, each member being bounded by air and each of the said pairs consisting of a diverging and a converging member, the one pair lying at the one and the other pair lying at the other side of the locus of diaphragm, the diverging member of each pair facing the locus of diaphragm and the concave surfaces of all members being turned toward this locus, those surfaces of each pair which face each other having different radii of curvature and those surfaces of the diverging members which face the locus of diaphragm being spaced at a distance greater than four fifths of the arithmetical means of the ralii of curvature of these two surfaces.

2. An anastigmatic objective for photography and projection, comprising two pairs of meniscal members, each member being bounded by air and each of the said pairs consisting of a diverging and a converging member, the one pair lying at the one and the other pair lying at the other side of the locus of diaphragm, the diverging member of each pair facing the locus of diaphragm and the concave surfaces of all members being turned toward this locus, those surfaces of each pair which face each other having different radii of curvature and those surfaces of the diverging members which face the locus of diaphragm being spaced at a distance greater than the arithmetical means of the radii of curvature of these two surfaces.

3. An anastigmatic objective for photography and projection, comprising two pairs of single meniscal lenses which are bounded by air and each of the said pairs consisting of a diverging and a converging lens, the one pair lying at the one and the other pair lying at the other side of the locus of diaphragm, the diverging lens of each pair facing the locus of diaphragm and the concave surfaces of all lenses being turned toward this locus, those surfaces of each pair which face each other having different radii of curvature and those surfaces of the diverging lenses which face the locus of diaphragm being spaced at a distance greater than four fifths of the arithmetical means of the radii of curvature of these two surfaces, the refractive indices of the diverging lenses being greater than 1.65.

4. An anastigmatic objective for photography and projection, comprising two pairs of single meniscal lenses which are bounded by air and each of the said pairs consisting of a diverging and a converging lens, the one pair lying at the one and the other pair lying at the other side of the locus of diaphragm, the diverging lens of each pair facing the locus of diaphragm and the concave surfaces of all lenses being turned toward this locus, those surfaces of each pair which face each other having different radii of curvature and those surfaces of the diverging lenses which face the locus of diaphragm being spaced at a distance greater than four fifths of the arithmetical means of the radii of curvature of these two surfaces, and the central thicknesses of these lenses being smaller than 2% of the focal length of the objective.

5. An anastigmatic objective for photography and projection, comprising two pairs of single meniscal lenses which are bounded by air and each of the said pairs consisting of a diverging and a converging lens, the one pair lying at the one and the other pair lying at the other side of the locus of diaphragm, the diverging lens of each pair facing the locus of diaphragm and the concave surfaces of all lenses being turned toward this locus, those surfaces of each pair which face each other having different radii of curvature and those surfaces of the diverging lenses which face the locus of diaphragm being spaced at a distance greater than four fifths of the arithmetical means of the radii of curvature of these two surfaces, the refractive indices of the diverging lenses being greater than 1.65, and the central thicknesses of these lenses being smaller than 2% of the focal length of the objective.

6. An anastigmatic objective for photography and projection, comprising two pairs of meniscal members, each member being bounded by air, and each of the said pairs consisting of a diverging and a converging member, the one pair lying at the one and the other pair lying at the other side of the locus of diaphragm, the diverging member of each pair facing the locus of diaphragm and the concave surfaces of all members being turned toward this locus, those surfaces of each pair which face each other having different radii of curvature and those surfaces of the diverging members which face the locus of diaphragm being spaced at a distance greater than four fifths of the arithmetical means of the radii of curvature of these two surfaces, the objective being symmetrical with the exception of one pair of members whose two members lie equally to the locus of diaphragm.

7. An anastigmatic objective for photography and projection, comprising two pairs of meniscal members, each member being bounded by air, and each of the said pairs consisting of a diverging and a converging member, the one pair lying at the one and the other pair lying at the other side of the locus of diaphragm, the diverging member of each pair facing the locus of diaphragm and the concave surfaces of all members being turned toward this locus, those surfaces of each pair which face each other having different radii of curvature and those surfaces of the diverging members which face the locus of diaphragm being spaced at a distance greater than four fifths of the arithmetical means of the radii of curvature of these two surfaces, the objective having also at least one lens which lies outside the said members and whose radii of curvature are, absolutely, greater than the focal length of the objective.

8. An anastigmatic objective for photography and projection, comprising two pairs of meniscal members, each member being bounded by air, and each of the said pairs consisting of a diverging and a converging member, the one pair lying at the one and the other pair lying at the other side of the locus of diaphragm, the diverging member of each pair facing the locus of diaphragm and the concave surfaces of all members being turned toward this locus, those surfaces of each pair which face each other having different radii of curvature and those surfaces of the diverging members which face the locus of diaphragm being spaced at a distance greater than four fifths of the arithmetical means of the radii of curvature of these two surfaces, the objective having also a plano-parallel plate which lies outside the said members.

9. An anastigmatic objective for photography and projection, comprising two pairs of meniscal members, each member being bounded by air, and each of the said pairs consisting of a diverging and a converging member, the one pair lying at the one and the other pair lying at the other side of the locus of diaphragm, the diverging member of each pair facing the locus of diaphragm and the concave surfaces of all members being turned toward this locus, those surfaces of each pair which face each other having different radii of curvature and those surfaces of the diverging members which face the locus of diaphragm being spaced at a distance greater than four fifths of the arithmetical means of the radii of curvature of these two surfaces, the objective having also two exterior plano-parallel plates and being symmetrical to the locus of diaphragm.

ROBERT RICHTER.